United States Patent

Sergel et al.

[11] Patent Number: 5,546,330
[45] Date of Patent: Aug. 13, 1996

[54] METHOD AND DEVICE FOR DETERMINING OVERLAPPING LENGTH OF A WOUND STRIP OF MATERIAL

[75] Inventors: Horst Sergel, Hannover; Friedrich Bartsch, Neustadt, both of Germany

[73] Assignee: Continental Aktiengesellschaft, Hanover, Germany

[21] Appl. No.: 942,173

[22] Filed: Sep. 4, 1992

[30] Foreign Application Priority Data

Sep. 5, 1991 [DE] Germany ............................ 41 29 465.3

[51] Int. Cl.$^6$ .................................................... G01B 7/04
[52] U.S. Cl. ............... 364/562; 364/469.05; 364/469.01; 156/202; 156/203
[58] Field of Search ..................................... 364/468, 469, 364/472, 473, 560, 561, 562; 156/118, 110.1, 203, 202, 378; 33/1 N, 1 PT, 732, 734, 735, 739, 750, 754

[56] References Cited

U.S. PATENT DOCUMENTS

| | | |
|---|---|---|
| 4,052,599 | 10/1977 | Whiteley et al. ........................ 364/562 |
| 4,144,575 | 3/1979 | Schwarz ................................... 364/562 |
| 4,151,403 | 4/1979 | Woolston ................................. 364/562 |
| 4,161,110 | 7/1979 | Ritter et al. . |
| 4,443,290 | 4/1984 | Loeffler et al. ........................ 156/396 |
| 4,535,949 | 8/1985 | Olsson .................................... 364/562 |
| 4,835,698 | 5/1989 | Beery et al. ............................ 364/562 |
| 4,849,915 | 7/1989 | Worsley et al. ........................ 364/562 |
| 4,874,443 | 10/1989 | Kipling ................................... 156/64 |
| 4,902,372 | 2/1990 | Mick, Jr. et al. ...................... 156/361 |

Primary Examiner—Ellis B. Ramirez
Assistant Examiner—Kyle J. Choi
Attorney, Agent, or Firm—Robert W. Becker & Associates

[57] ABSTRACT

A method for determining a length, especially for determining an overlap length of a wound strip of material, is provided. In order to be able to automatically determine the overlap length it is suggested that the forward end of a strip of material applied to a winding drum is detected by a detector and, simultaneously, the corresponding angular position of the winding drum is measured. After the completion of the winding of the strip of material, its rearward end is detected by the detector and, simultaneously, the corresponding angular position of the winding drum is measured. Subsequently, a difference between the angular positions of the winding drum is used to determine the length of the strip of material.

8 Claims, 2 Drawing Sheets

5,546,330

METHOD AND DEVICE FOR DETERMINING OVERLAPPING LENGTH OF A WOUND STRIP OF MATERIAL

BACKGROUND OF THE INVENTION

The present invention relates to a method for determining a length, especially for determining the overlapping length of a wound strip of material, especially of a rubber strip, wherein the strip of material is wound onto a drum. The present invention further relates to a device for performing the inventive method.

During the manufacture of tires, the green tire is produced by winding strips of rubber of different kinds onto a winding drum, whereby the ends commonly overlap. In the context of this invention the term "strip of rubber" is to be understood not only as a strip of material of pure rubber, but also as a strip of material of rubberized fabric, for example, cord fabric. The production of a green tire starts with the application of the liner which is already placed with overlapping ends onto the winding drum. The overlapping length is approximately 30 mm. In the same manner, the carcass layer is subsequently applied, also with overlapping ends. In the course of the further manufacture of the tire, different fabric layers and rubber layers, respectively strips, are applied, also with certain predetermined overlapping lengths.

In the past, the control of the overlapping length has been achieved by having the operating personnel directly measure the overlapping length after the completed application of the strip of material. However, this results in the problem that, since a strip of material which contains unvulcanized rubber is elastically deformable, the visible end of the strip, i.e., the outer layer of the strip of material may be determined, but the beginning of the strip, i.e., the forward end may not be exactly determined because in the area of the beginning, where further layers of material have been applied, a slanted portion results due to elastic deformation within the layers so that the operating personnel no longer know where the exact beginning is located within the area of this slanted portion. This problem is further increased when the strip of material is applied in a plurality of windings.

It is therefore an object of the present invention to provide a method for measuring exactly the overlapping length and to provide a device for performing the inventive method.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
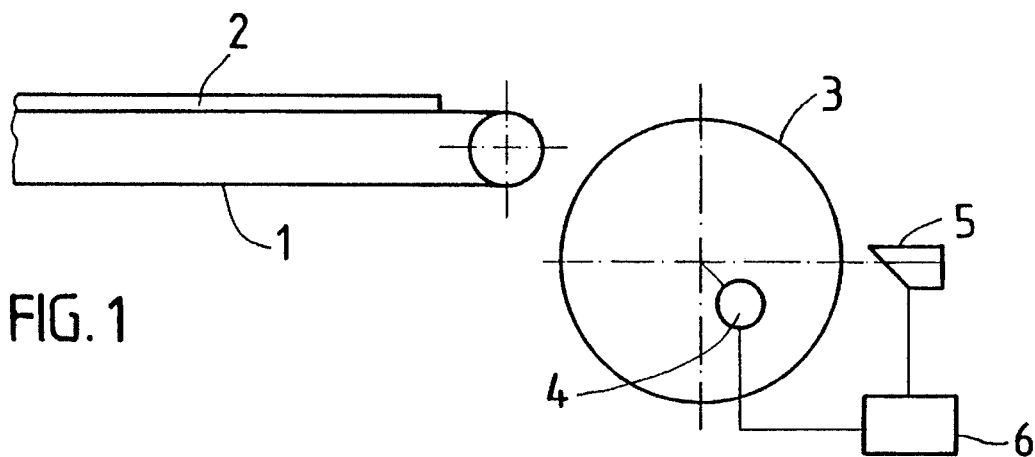
FIG. 1 shows the inventive device comprising a feeding device having a strip of material resting thereon, a winding drum which is provided with a measuring device for measuring angular positions of the drum, and a computing unit.
Figure 2:
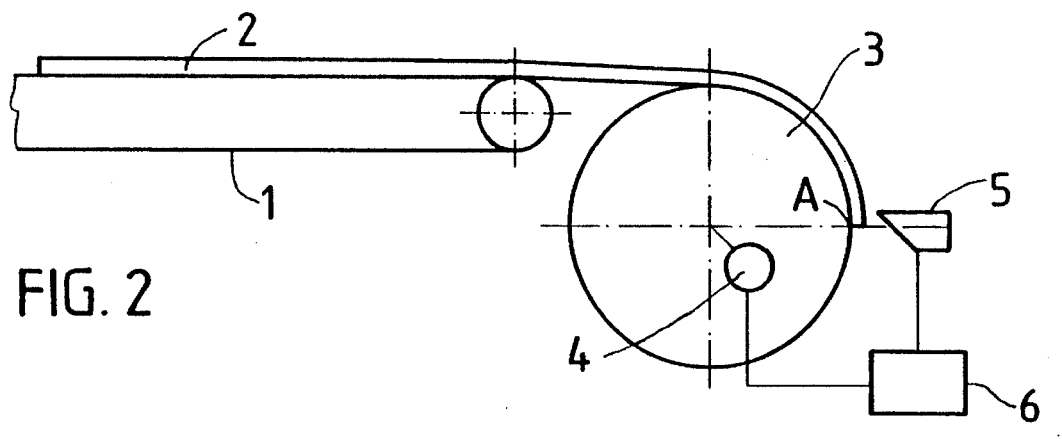
FIG. 2 shows the device of FIG. 1 in a position for determining the forward end of the strip of material.

The inventive method for determining a length of a strip of material wound onto a drum is comprised of the following steps:

Detecting the forward end of the strip of material placed on the drum with a detector and measuring simultaneously the corresponding first angular position of the drum;

Winding the strip of material onto the drum;

Detecting the rear end of the strip of material wound onto the drum with the detector and measuring simultaneously the corresponding second angular position of the drum; and Computing in a computing unit the length of the strip of material based on a difference between the first and the second angular position of the drum.

With the inventive method, the forward end of the strip of material applied to the drum is detected with a detector and, simultaneously, the corresponding angular position of the drum is measured. After the strip of material has been wound onto the drum, its rearward end is detected by the detector and, simultaneously, the corresponding angular position of the drum is measured. In the computing unit the length of the strip is then determined based on the difference between the angular positions of the drum.

The inventive method may further comprise the step of determining the overlap length of the strip of material based on the difference between the first and the second angular positions of the drum. In another embodiment of the present invention, the method further comprises the step of determining directly a gap between the forward end and the rearward end of the strip of material and displaying the corresponding result.

In an alternative embodiment, the method further comprises the steps of presetting a nominal value for the length of the strip of material and shutting off the feed of the strip of material when the actual length of the strip of material deviates from the nominal value.

The inventive device for performing the method of the present invention comprises a winding drum; a feeding device coordinated with the winding drum; a measuring device connected to the drum for measuring the angular position of the winding drum; a detector, coordinated with the circumference of the winding drum, for detecting the forward end and the rearward end of the strip of material; and a computing unit, connected to the measuring device and the detector, for acquiring and computing signals from the detector and the measuring device. Preferably, the computing unit further comprises a display unit. Expediently, the device also comprises a switching unit connected downstream of the computing unit for switching off the feeding device.

The invention is based on the knowledge that it is unfavorable to measure an overlap length only after the complete application of the strip of material and that it is favorable to divide the measuring process into two timely differing partial measuring step whereby in the first partial measuring step the exact position of the forward end of the strip of material is to be detected and in the second measuring step the exact position of the rearward end of the strip of material is to be determined. The invention is advantageous because an objective determination of the length is provided so that no subjective measurements, especially inconsistencies in reading the gauges by the operating personnel, no longer must be relied upon. Since the measurements are carried out by machines and the computation is carried out by a computing unit, the present invention may be advantageously integrated into an automated manufacturing process. In a simple manner a continuous control may be achieved which, in view of the manufacturing tolerances which become more and more narrow, is especially important. According to an advantageous embodiment of the invention an automated switch-off of the feeding device may be provided when the nominal value (including tolerances) for the overlap length is surpassed. Furthermore, the invention is usable not only where overlapping lengths must be exactly determined, but also where a flush abutting of the ends of a material strip with straight or slanted edges results in, for example, a gap between the ends which indicates a too short strip of material. This problem occurs, for example, during the application of a tread strip when completing a green tire. The tread strip is cut at its ends so as to be slanted to the radial direction of the tire whereby these slanted ends are then abutted. Only minimal deviations from the exact circumferential length are allowed and with the present invention a deviation from a nominal value in both directions may be detected in a simple manner.

The present invention is of course not only applicable in the manufacture of tires, but anywhere where strips of material are wound onto a base and an exact circumferential length is required.

DESCRIPTION OF PREFERRED EMBODIMENTS

The present invention will now be described in detail with the aid of several specific embodiments, utilizing FIGS. 1 through 4.

Before describing the method of the present invention the corresponding device will be described in detail. A commonly employed feeding device 1 serves to feed a strip of material 2, for example, a strip of rubber, to the winding drum 3. The winding drum 3 has a measuring device 4 for measuring the angular position of the winding drum 3 which continuously determines the respective angle of rotation. The measuring device 4, for example, may be in the form of an angular momentum sender. A detector 5 is coordinated with the circumference of the winding drum 3 and can detect the forward end and the rearward end, i.e., the beginning and the end, of the material strip 2 applied to the winding drum 3. The detector 5, for example, may be a laser or any other device for optical detection. The measuring device 4 and the detector 5 are connected to a computing unit 6 such that a synchronous measurement of the forward and rearward ends of the strip of material 2 and of the corresponding instant angular positions of the winding drum 3 takes place. In the computing unit 6 the exact circumferential length of the drum 3 may be memorized so that not only the absolute length of the strip of material 2 may be determined, but also directly the overlap length, respectively, a gap between the ends of the strip of material 2. The computing unit 6 should furthermore comprise a display unit, for example, in the form of an optical display or a printing unit.

Figure 3:
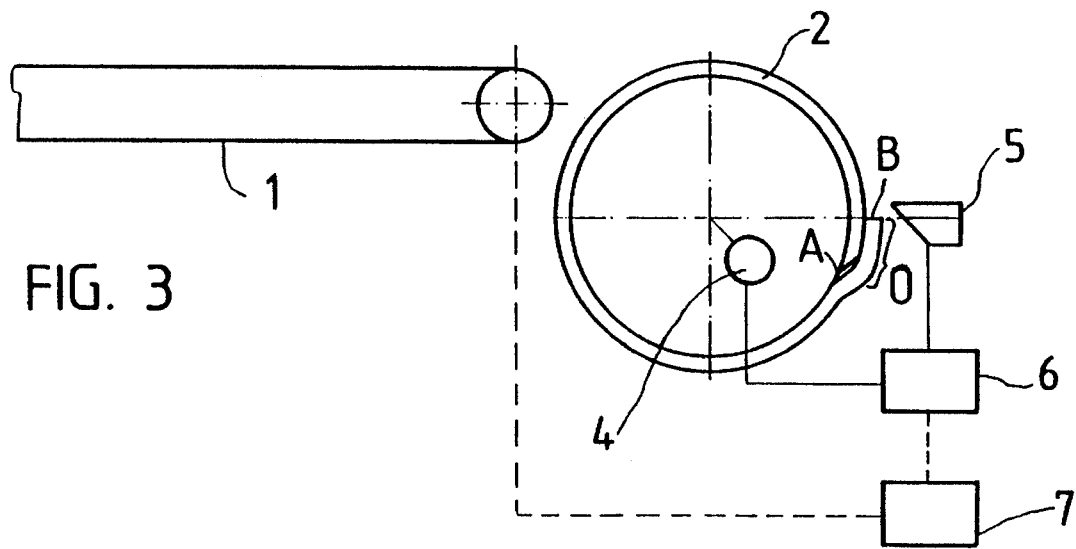
FIG. 3 shows the device of FIG. 1 in a position for determining the rearward end of the strip of material.
Figure 4:
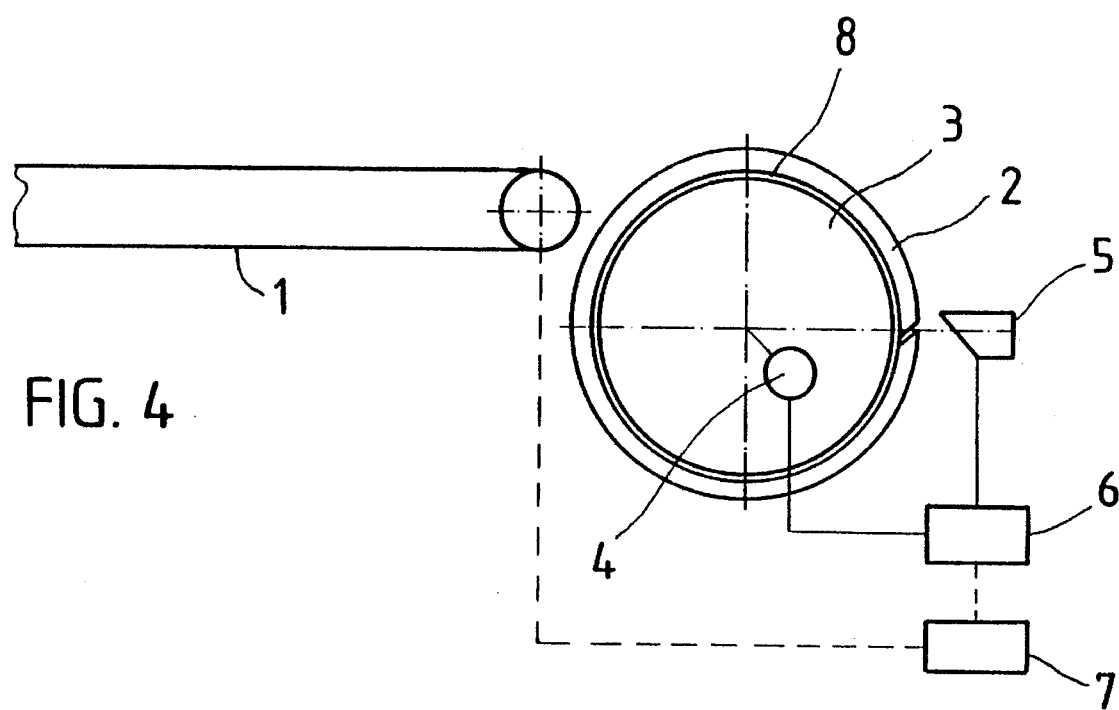
FIG. 4 shows a device with a strip of material wound onto the drum whereby the strip of material is too short.

According to FIGS. 3 and 4, the computing unit 6 may have arranged downstream thereof a switching unit 7 which upon deviation of the length of the strip of material from a given nominal value automatically shuts off the feeding device.

In the following the inventive method will be described in detail. After activation of the feeding device 1, the strip of material 2 resting on the feeding device 1 in FIG. 1 is wound onto the winding drum 3. In the position represented in FIG. 2 the forward end A of the strip 2 is detected by the detector 5.

This signal as well as the corresponding signal from the measuring device 4 for the measured angular position of the winding drum 3 are sent to the computing unit 6. After the winding of the strip 2 is completed, the rearward end B passes the detector 5 and the corresponding signals from the detector 5 and the measuring device 4 (the angular position of the winding drum 3) are sent to the computing unit 6.

By employing the two measurements such that by determining the difference between the two angular positions and subtracting a complete revolution of the drum, i.e., 360°, the computing unit 6 is able to provide the overlap value O. By comparing this value with the actual measured overlap length a signal may be generated that in the case of a deviation controls the switching unit 7 which, in turn, switches off the feeding device 2 so that the length for the strip of material 2 to be applied may be corrected.

In the representation according to FIG. 1 a carcass body 8 with its different components is applied to the winding drum 3. The material strip 2 in this embodiment corresponds to the tread strip comprised of unvulcanized rubber which is to be applied in the final step. The ends of the tread strip are cut at a slant relative to the radial direction. It is desired to provide a circumferential length of the tread strip such that the slanted ends abut; i.e., neither an overlap nor a gap should result. According to the aforedescribed method, in the representation of FIG. 4 an undesired gap is detected between the ends of the tread strip with the inventive device. Via the switching unit 7 the feeding device 1 is thus turned off and the length of the tread strip can be corrected.

The present invention is, of course, in no way restricted to the specific disclosure of the specification and drawings, but also encompasses any modifications within the scope of the appended claims.

What we claim is:

1. A method for determining a length of a strip of material wound onto a winding drum, comprising the steps of:

detecting a forward end of the strip of material placed on the winding drum with a detector and measuring simultaneously a corresponding first angular position of the winding drum;

winding the strip of material onto the winding drum;

detecting a rearward end of the strip of material wound onto the winding drum with the detector and measuring simultaneously a corresponding second angular position of the winding drum; and computing in a computing unit the length of the strip of material based on a difference between said first and said second angular positions of the winding drum.

2. A method according to claim 1, further comprising the step of:

determining an overlap length of the strip of material based on the difference between said first and said second angular positions of the winding drum.

3. A method according to claim 1, further comprising the step of:

determining directly a gap between the forward end and the rearward end and displaying a corresponding result.

4. A method according to claim 1, further comprising the steps of:

presetting a nominal value for the length of the strip of material; and shutting of the feed of the strip of material when an actual length of the strip of material deviates from said nominal value.

5. A device for performing a method for determining a length of a strip of material wound onto a winding drum, said device comprising:

a feeding device for feeding the strip of material;

a winding drum coordinated with said feeding device for winding the strip of material;

a detector, coordinated with the circumference of said winding drum, for detecting the forward end and the rearward end of the strip of material;

a measuring device connected to said winding drum for measuring a first and a second angular position of said winding drum corresponding to the forward end and the rearward end of the strip of material; and a computing unit, connected to said measuring device and said detector, for acquiring signals from said detector and said measuring device and computing the length of the strip of material based on a difference between said first and said second angular positions of said winding drum.

6. A device according to claim 5, wherein said computing unit further comprises a display unit.

7. A device according to claim 5, further comprising a switching unit connected downstream of said computing unit for switching off said feeding device.

8. A device according to claim 5, wherein said computing unit comprises a means for memorizing an exact circumferential length of said winding drum for computing an overlap length of the strip of material.

* * * * *